United States Patent
Hwang et al.

(10) Patent No.: US 6,404,540 B1
(45) Date of Patent: Jun. 11, 2002

(54) L-BAND OPTICAL FIBER AMPLIFIER USING SEED BEAM

(75) Inventors: Seong-Teak Hwang; Soo-Young Yoon; Rae-Sung Jung; Jeong-Mee Kim; Sung-Jun Kim, all of Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/597,779

(22) Filed: Jun. 20, 2000

(30) Foreign Application Priority Data

Jun. 23, 1999 (KR) .............................. 99-23777

(51) Int. Cl.[7] ................................ H01S 3/00
(52) U.S. Cl. ................... 359/341.1; 359/337.1
(58) Field of Search ................. 359/337, 337.1, 359/341.1

(56) References Cited

U.S. PATENT DOCUMENTS

| | | |
|---|---|---|
| 5,136,420 A | 8/1992 | Inagaki et al. |
| 5,530,582 A | 6/1996 | Clark |
| 5,568,309 A | 10/1996 | Rockwell |
| 5,652,763 A | 7/1997 | Delfyett, Jr. |
| 5,689,595 A | 11/1997 | Pan |
| 5,790,303 A | 8/1998 | Weston et al. |
| 5,815,309 A | 9/1998 | Lawrence et al. |
| 5,861,973 A | 1/1999 | Inagaki et al. |
| 5,963,363 A | 10/1999 | Weston et al. |
| 6,023,366 A * | 2/2000 | Kinoshita ............ 359/341 |
| 6,141,142 A * | 10/2000 | Espindola et al. ....... 359/341 |
| 6,233,092 B1 * | 5/2001 | Flood et al. ............ 359/345 |

* cited by examiner

Primary Examiner—Mark Hellner
(74) Attorney, Agent, or Firm—Robert E. Bushnell, Esq.

(57) ABSTRACT

A L-band(long-band) optical fiber amplifier is provided. The L-band optical fiber amplifier includes an optical fiber doped with a rare-earth element, at least one pumping light source for emitting pumping light to the optical fiber, a seed beam source for emitting a seed beam at a predetermined wavelength band, and a seed beam coupler disposed between an input terminal and the optical fiber, for coupling an input optical signal with the seed beam and feeding the coupled light forward to the optical fiber. By use of the seed beam, the L-band optical fiber amplifier improves gain flatness characteristics at wavelengths of an optical signal and increases amplification efficiency when the length of the optical fiber and the intensities of the optical signal and the pumping light are changed.

26 Claims, 5 Drawing Sheets

L-BAND OPTICAL FIBER AMPLIFIER USING SEED BEAM

CLAIM OF PRIORITY

This application makes reference to, incorporates the same herein, and claims all benefits accruing under 35 U.S.C. §119 from an application entitled L-Band Optical Fiber Amplifier Using Seed Beam earlier filed in the Korean Industrial Property Office on Jun. 23, 1999, and there duly assigned Ser. No. 99-23777.

BACKGROUND OF THE INVENTION

1. Technical Field

The present invention relates generally to an optical fiber amplifier, and in particular, to an L-band optical fiber amplifier using amplification of an optical fiber doped with a rare-earth element.

2. Related Art

Wavelength division multiplex (WDM) transmission is an information transmission scheme using optical fibers in which the wavelength area of an optical fiber is separated into a plurality of channels, the channels are multiplexed, and thus signals at different wavelengths are transmitted through the optical fiber at the same time, to thereby increase information transmission capacity.

A plurality of optical amplifiers are used between a transmitter and a receiver in a wavelength division multiplex transmission system to compensate for signal attenuation resulting from long distance transmission. The efficiency of optical amplifiers is important for transmission of optical signals.

I have found that it would be desirable to increase optical amplification efficiency. Efforts have been made to improve optical amplification.

Exemplars of recent efforts in the art include U.S. Pat. No. 5,815,309 for An Optical a Amplifier and Process for Amplifying an Optical Signal Propagating in a Fiber Optic issued to Lawrence et al., U.S. Pat. No. 5,652,763 for A Mode Locked Laser Diode in a High Power Solid State Regenerative Amplifier and Mount Mechanism issued to Delfyett, Jr., U.S. Pat. No. 5,790,303 for A System for Amplifying an Optical Pulse Using a Diode-Pumped, Q-switched, Intracavity-Doubled Laser to Pump an Optical Amplifier issued to Weston et al., U.S. Pat. No. 5,530,582 for A Fiber Source For Seeding an Ultrashort Optical Pulse Amplifier issued to Clark, U.S. Pat. No. 5,861,973 for An Optical Amplifier for Collectively Amplifying Optical Signals Having a Plurality of Multiplexed Wavelengths issued to Inagaki et al., U.S. Pat. No. 5,963,363 for A System and Method for Amplifying an Optical Pulse and Pumping Laser Therefor issued to Weston et al., U.S. Pat. No. 5,568,309 for A System andMethodforAmplification and Wavefront Compensation of Depolarized Optical Beams issued to Rockwell, U.S. Pat. No. 5,689,595 for A Rare Earth-doped Fiber Amplifier Assemblies for Fiberoptic Networks issued to Pan, and U.S. Pat. No. 5,136,420 for An Optical Fibre Amplifier issued to Inagaki et al.

While these recent efforts provide advantages,I note that they fail to adequately provide an L-band (long band) optical amplifier using seed beam increasing L-band amplification efficiency.

SUMMARY OF THE INVENTION

It is, therefore, an object of the present invention to provide an L-band optical fiber amplifier with increased L-band amplification efficiency.

It is another object of the present invention to provide an L-band optical fiber amplifier with improved gain flatness with respect to wavelengths of signal light when the length of an optical fiber and the intensities of input signal light and pumping light.

The above objects and others are achieved by providing an L-band optical fiber amplifier. The L-band optical fiber amplifier includes an optical fiber doped with a rare-earth element, at least one pumping light source for emitting pumping light to the optical fiber, a seed beam source for emitting a seed beam at a predetermined wavelength band, and a seed beam coupler disposed between an input terminal and the optical fiber, for coupling input signal light with the seed beam and feeding the coupled light forward to the optical fiber.

To achieve these and other objects in accordance with the principles of the present invention, as embodied and broadly described, the present invention provides an L-band optical fiber amplifier apparatus, comprising: an optical fiber being doped with a rare-earth element; at least one pumping light source emitting pumping light to said optical fiber; a seed beam source emitting a seed beam at a predetermined wavelength band; and a seed beam coupler being disposed between an input terminal and said optical fiber, coupling an input optical signal with the seed beam and feeding the coupled light forward to said optical fiber.

To achieve these and other objects in accordance with the principles of the present invention, as embodied and broadly described, the present invention provides an L-band optical fiber amplifier apparatus, comprising: an optical fiber being doped with a rare-earth element; at least one pumping light source emitting pumping light to said optical fiber; a seed beam source emitting a seed beam at a predetermined wavelength band; and a seed beam coupler being disposed between an output terminal and said optical fiber, coupling an input optical signal with the seed beam and feeding the coupled light reversely to said optical fiber.

To achieve these and other objects in accordance with the principles of the present invention, as embodied and broadly described, the present invention provides an apparatus, comprising: an optical fiber; at least one pumping light source emitting pumping light to said optical fiber; a seed beam source emitting a seed beam; and a seed beam coupler coupling an input optical signal with the seed beam and feeding the coupled light to said optical fiber.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

A plurality of optical amplifiers are used between a transmitter and a receiver in a wavelength division multiplex transmission system to compensate for signal attenuation resulting from long distance transmission. One of the optical amplifiers is an optical fiber amplifier including an optical fiber doped with a rare-earth element such as erbium (Er) and a pumping source like a pump laser diode. Besides Er, ytterbium (Yb) and neodymium (Nd) are rare-earth elements.

Erbium-doped fiber amplifiers (EDFAs) are categorized into a C-band (conventional band) optical fiber using a band ranging from 1528 nanometers to 1562 nanometers (nm) as an amplification band and an L-band (long band) optical fiber using a band ranging from 1575 to 1605 nm as an amplification band. In particular, the L-band optical fiber is called a 1.58 micrometer ($\mu$m) optical fiber amplifier, relative to a C-band optical fiber amplifier using an amplification band between 1.52 $\mu$m and 1.56 $\mu$m.

Figure 1:
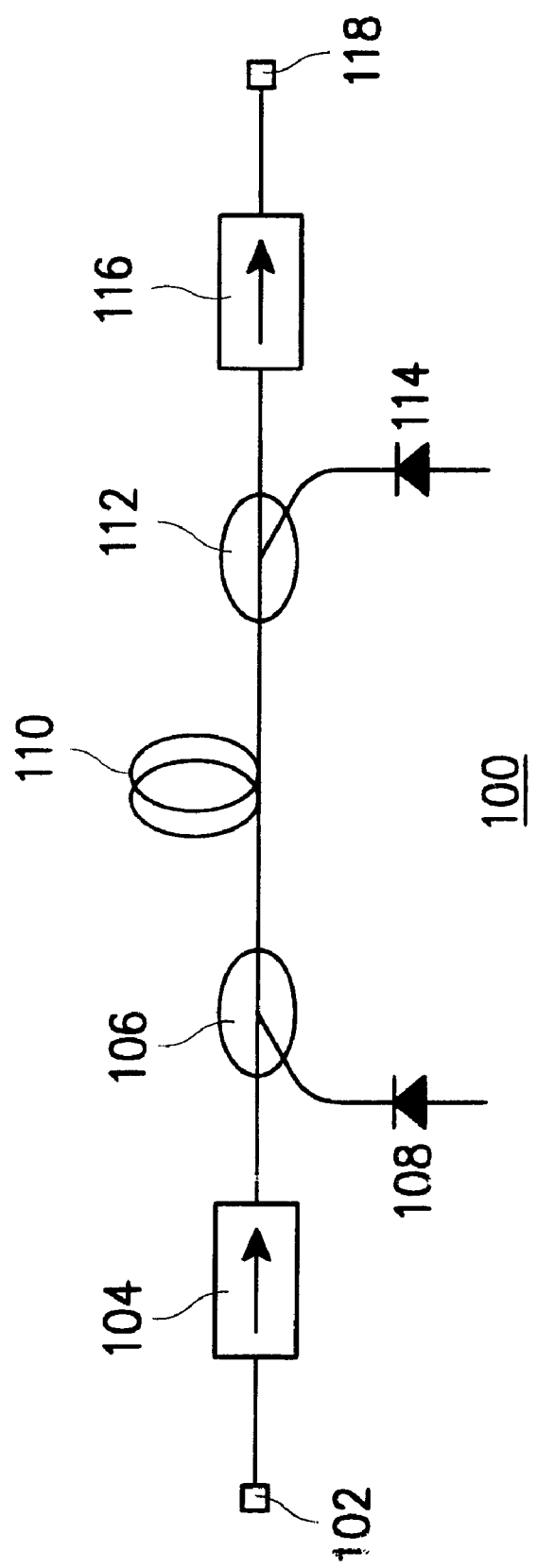
FIG. 1 is a schematic view of an L-band optical fiber amplifier without a seed beam source.

FIG. 1 is a schematic view of an L-band (long band) optical fiber amplifier without a seed beam source. In FIG. 1, an L-band optical fiber 100 includes an input terminal 102, a first optical isolator 104, a first optical coupler 106, a first pumping light source 108, an optical fiber doped with a rare-earth element 110, a second optical coupler 112, a second pumping light source 114, a second optical isolator 116, and an output terminal 118.

The L-band optical fiber amplifier 100 receives signal light from a signal light source of a transmitter through the input terminal 102. The first optical coupler 106 couples the signal light with forward pumping light received from the first pumping light source 108 and feeds the coupled light to the front end of the optical fiber 110. Reverse pumping light generated from the second pumping light source 114 is fed to the rear end of the optical fiber 110 through the second optical coupler 112.

The signal light is amplified due to the stimulated emission of rare-earth element ions (for example, Er ions) excited by the forward and reverse pumping light in the optical fiber 110. Amplified spontaneous emission (ASE) light is generated in the course of the amplification. The amplified signal light and amplified spontaneous emission light are applied to the output terminal 118 through the rear end of the optical fiber 110.

The first optical isolator 104 acts to block reverse amplified spontaneous emission light reflected from the front end of the optical fiber 110 and fed back to the input terminal 102 from re-impinging on the optical fiber 110 and thus decreasing amplification efficiency. The second optical isolator 116 acts to block amplified spontaneous emission light output from the rear end of the optical fiber 110 and reflected back from the output terminal 118 from re-impinging on the optical fiber 110 and thus decreasing the amplification efficiency of the optical fiber 110.

The L-band optical fiber amplifier 100 uses an optical fiber doped with a rare-earth element 5 to 20 times longer as an amplification medium than a C-band optical fiber amplifier. With the longer optical fiber doped with a rare-earth element, a C-band gain is decreased but an L-band gain is relatively increased, allowing the L band to be used as a new transmission wavelength band. Consequently, the optical fiber can be used as an L-band optical fiber amplifier. That is, C-band amplified spontaneous emission light generated due to the stimulated emission of pump light-excited rare-earth element ions amplifies L-band signal light in the L-band optical fiber 100.

Meanwhile, the pumping efficiency of an optical fiber amplifier is proportional to the peak power rather than the total power of pumping light. Therefore, pumping light with high total power but low peak power decreases the pumping efficiency and thus the amplification efficiency of the optical fiber amplifier.

The L-band optical fiber amplifier 100, as stated above, amplifies L-band signal light with C-band amplified spontaneous emission light generated due to the stimulated emission of rare-earth element ions excited by pumping light incident from a pumping light source.

The C-band amplified spontaneous emission (ASE) light is characterized by high total power and low peak power because of its wide wavelength band. That is, the higher the total power of the amplified spontaneous emission light as pumping light at each wavelength, the more excited the rare-earth element ions in the optical fiber 110, which implies that L-band signal light can be amplified efficiently. However, the nature of the amplified spontaneous emission light decreases the amplification efficiency of the L-band signal light.

The L-band optical fiber amplifier 100 has a narrow amplification gain difference between signal light at different wavelengths, exhibiting good gain flatness characteristics, as compared to the C-band optical fiber amplifier. Here, gain flatness is defined as the difference between a maximum gain and a minimum gain. However, if the length of the optical fiber 110 and the intensities of the input signal light and pumping light are changed, the L-band optical fiber amplifier 110 has an increased amplification gain difference between wavelengths and as a result, exhibits bad gain flatness characteristics, like the C-band optical fiber amplifier. Therefore, when signal light is received at the input terminal through a plurality of optical fiber amplifiers or intermediate nodes, the intensity of the input optical signal is significantly changed. Hence, the difference in bit error rate (BER) between channels is increased and as a result, signal distortion occurs.

Preferred embodiments of the present invention will be described hereinbelow with reference to the accompanying drawings. In the following description, well-known functions or constructions are not described in detail since they would obscure the invention in unnecessary detail.

The present invention intends to provide an L-band optical fiber amplifier which can increase the amplification efficiency and control gain flatness characteristics with respect to wavelengths using seed beams emitted from a seed beam source.

Figure 2:
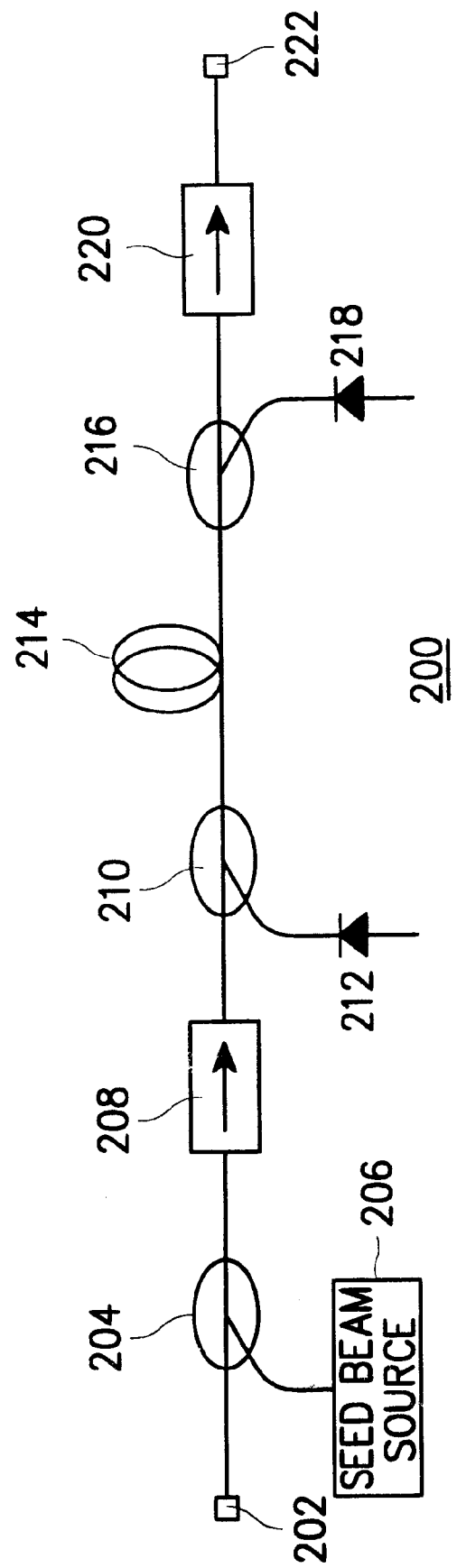
FIG. 2 is a schematic view of a preferred embodiment of an L-band optical fiber, according to the principles of the present invention.

FIG. 2 is a schematic view of an L-band (long band) optical fiber amplifier according to a preferred embodiment of the present invention, wherein a seed beam is emitted from a seed beam source forward to an optical fiber. In FIG. 2, the L-band optical fiber amplifier 200 includes an input terminal 202, a seed beam coupler 204, a seed beam source 206, a first optical isolator 208, a first optical coupler 210, a first pumping light source 212, an optical fiber doped with a rare-earth element 214, a second optical coupler 216, a second pumping light source 218, a second optical isolator 220, and an output terminal 222.

The input terminal 202 receives signal light from a signal light source of a transmitter, including L-band(long band) light ranging 1575 to 1605 nm. The seedbeam source 206 generates a seed beam in a predetermined wavelength band. The seed beam source 206 can be a light emitting diode (LED) or a laser diode (LD) which emits seed beams between 1525 and 1570 nm in the C-band (conventional band), preferably between 1555 and 1563 nm.

Figure 5:
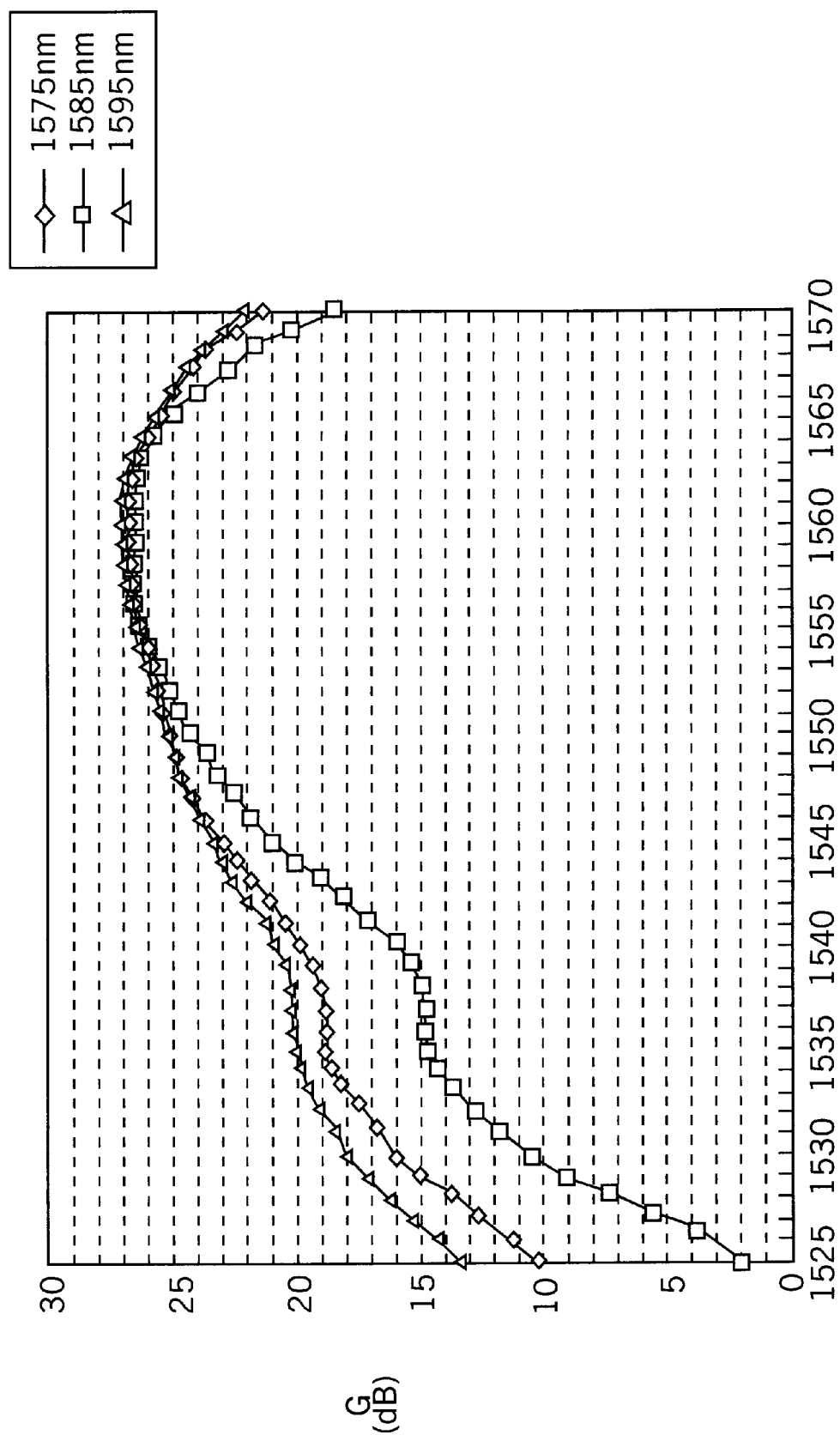
FIG. 5 is a graph showing gain characteristics with respect to wavelengths of seed beams in the L-band optical fiber amplifier of the present invention, according to the principles of the present invention.

The seed beam coupler 204 couples the seed beam emitted from the seed beam source 206 with the signal light received from the input terminal 202 and feeds the coupled light to the first optical coupler 210. An optical coupler is used as the seed beam coupler 204. With the seed beam between 1555 and 1563 nm applied to the optical fiber 214, the gain of the L-band optical fiber amplifier is as high as 26 decibels to 27 decibels (dB) and flat, as shown in FIG. 5.

The seed beam is amplified while it passes through the front end of the optical fiber 214 excited by pumping light. The amplified seed beam excites the rear end of the optical fiber 214, thus amplifying the L-band signal light. The L-band optical fiber amplifier 200 of the present invention amplifies the L-band signal light with the total power of the primarily amplified seed beam increased. As a result, the amplification efficiency of the L-band signal light is increased.

The first optical isolator 208 prevents the distortion of the input signal light by blocking reverse amplified spontaneous emission (ASE) light directed from the front end of the optical fiber 214 toward the input terminal 202. The first pumping light source 212 emits pumping light at a predetermined wavelength. A pump laser diode for emitting pumping light at 980 or 1480 nm is used as the first pumping light source 212.

The first optical coupler 210 couples the signal light coupled with the seed beam with the pumping light and feeds the result forward to the front end of the optical fiber 214. The optical fiber 214 is doped with a rare-earth element and serves as a medium of amplifying signal light in the L-band optical fiber amplifier 200. An erbium doped fiber (EDF), characterized by a minimum loss at 1550 nm, is used as the optical fiber 214. Amplification occurs in the optical fiber 214 by mutual reaction of the seed beam, signal light, and forward and reverse pumping light received through the front and rear ends of the optical fiber 214.

The L-band signal light is amplified by reaction between the amplified spontaneous emission (ASE) light and the seed beam. The amplified spontaneous emission light exhibits a low amplification efficiency for the L-band signal light since its total power across whole wavelengths is high but its peak power is low at each wavelength. However, the seed beam forward received from the seed beam source 206 is amplified. The resulting increase of its peak power, which serves as exciting light, increases the amplification efficiency of the L-band signal light.

That is, the amplification efficiency of signal light increases with higher peak power of pumping light at a wavelength. The L-band signal light amplified in the optical fiber 214 is applied to the output terminal 222 through the rear end of the optical fiber 214.

The second pumping light source 218 emits pumping light at a predetermined wavelength. A pump laser diode (LD) for emitting pumping light at 980 or 1480 nm is used as the second pumping light source 218.

The second optical coupler 216 outputs reverse pumping light received from the second pumping light source 218 to the rear end of the optical fiber 214.

The second optical isolator 220 prevents the decrease of the amplification efficiency of the optical fiber 214 by blocking the amplified signal light and amplified spontaneous emission (ASE) light output from the rear end of the optical fiber 214 and then reflected from the output terminal 222, from re-impinging on the rear end of the optical fiber 214.

While the first embodiment of the present invention has been described in the context of the L-band optical fiber amplifier employing a bi-directional pumping mechanism shown in FIG. 2, it is clear to those skilled in the field that the present invention is applicable to an L-band optical fiber amplifier using one of forward and reverse pumping mechanisms.

Figure 3:
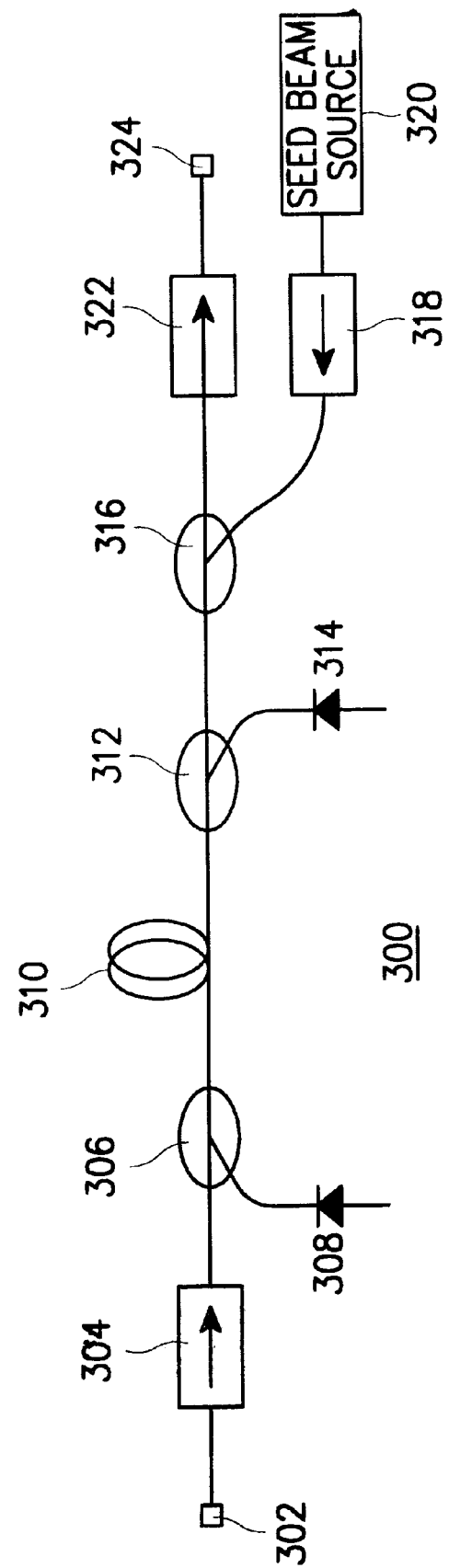
FIG. 3 is a schematic view of another preferred embodiment of the L-band optical fiber amplifier, according to the principles of the present invention.

FIG. 3 is a schematic view of an L-band optical fiber amplifier according to another preferred embodiment of the present invention, wherein a seed beam emitted from a seed beam source is applied reversely to an optical fiber. In FIG. 3, the L-band optical fiber amplifier 300 includes an input terminal 302, a first optical isolator 304, a first optical coupler 306, a first pumping light source 308, an optical fiber doped with a rare-earth element 310, a second optical coupler 312, a second pumping light source 314, a seed beam coupler 316, a second optical isolator 318, a seed beam source 320, a third optical isolator 322, and an output terminal 324.

The input terminal 302 receives signal light from a signal light source of a transmitter, including L-band light at 1575 to 1605 nm. The first optical isolator 304 prevents the distortion of the input signal light by blocking reverse amplified spontaneous emission (ASE) light directed from the front end of the optical fiber 310 toward the input terminal 302.

The first pumping light source 308 emits pumping light at a predetermined wavelength. A pump laser diode for emitting pumping light at 980 or 1480 nm is used as the first pumping light source 308. The first optical coupler 306 couples the input signal light with the pumping light a received from the first pumping light source 308 and feeds the coupled light forward to the front end of the optical fiber 310.

The optical fiber 310 is doped with a rare-earth element and serves as a medium of amplifing signal light in the L-band optical fiber amplifier 300. An erbium doped fiber is used as the optical fiber 310. Amplification occurs in the optical fiber 310 by mutual reaction of the seed beam, signal light, and forward and reverse pumping light received through the front and rear ends of the optical fiber 310.

The L-band signal light is amplified by reaction between the amplified spontaneous emission (ASE) light and the seed beam. The amplified spontaneous emission light exhibits a low amplification efficiency for the L-band signal light since its total power across whole wavelengths is high but its peak power is low at each wavelength.

However, the seed beam received reversely from the seed beam source 320 is amplified. The resulting increase of its peak power, which serves as exciting light, increases the amplification efficiency of the L-band signal light. As will be described referring to FIG. 4, the second embodiment of the present invention where a seed beam is reversely input has a lower amplification efficiency of the L-band signal light than the first embodiment of the present invention where a seed beam is forward input. The L-band signal light amplified in the optical fiber 310 is applied to the output terminal 324 through the rear end of the optical fiber 310.

The second pumping light source 314 emits pumping light at a predetermined wavelength. A pump laser diode for emitting pumping light at 980 or 1480 nm is used as the second pumping light source 314. The second optical coupler 312 outputs reverse pumping light received from the second pumping light source 314 to the rear end of the optical fiber 310.

The seed beam coupler 316 applies the seed beam emitted from the seed beam source 320 to the rear end of the optical fiber 310. A typical optical coupler is used as the seed beam coupler 316, as in the first embodiment of the present invention.

The seed beam source 320 generates a seed beam in a predetermined wavelength band. The seed beam source 320 can be light emitting diode or a laser diode which emits seed beams between 1525 and 1570 nm in the C-band, preferably between 1555 and 1563 nm. With the seed beam is between 1555 and 1563 nm applied to the optical fiber 310, the gain of the L-band optical fiber amplifier is as high as 26 to 27 dB and flat, as shown in FIG. 5.

The seed beam is reversely input and amplified in the optical fiber 310 while it passes through the front end of the optical fiber 310 excited by pumping light. The amplified seed beam excites the rear end of the optical fiber 310, thus amplifying the L-band signal light. The L-band optical fiber amplifier 300 of the present invention amplifies the L-band signal light with the total power of the primarily amplified seed beam increased. As a result, the amplification efficiency of the L-band signal light is increased.

The second optical isolator 318 blocks the light output from the rear end of the optical fiber 310 from being fed to the seed beam source 320. The third optical isolator 322 prevents the decrease of the amplification efficiency of the optical fiber 310 by blocking the amplified signal light and amplified spontaneous emission (ASE) light reflected from the output terminal 324 from re-impinging on the rear end of the optical fiber 310.

While the second embodiment of the present invention has been described in the context of the L-band optical fiber amplifier employing a bi-directional pumping mechanism as shown in FIG. 3, it is clear to those skilled in the field that the present invention is applicable to an L-band optical fiber amplifier using one of forward and reverse pumping schemes.

Figure 4:
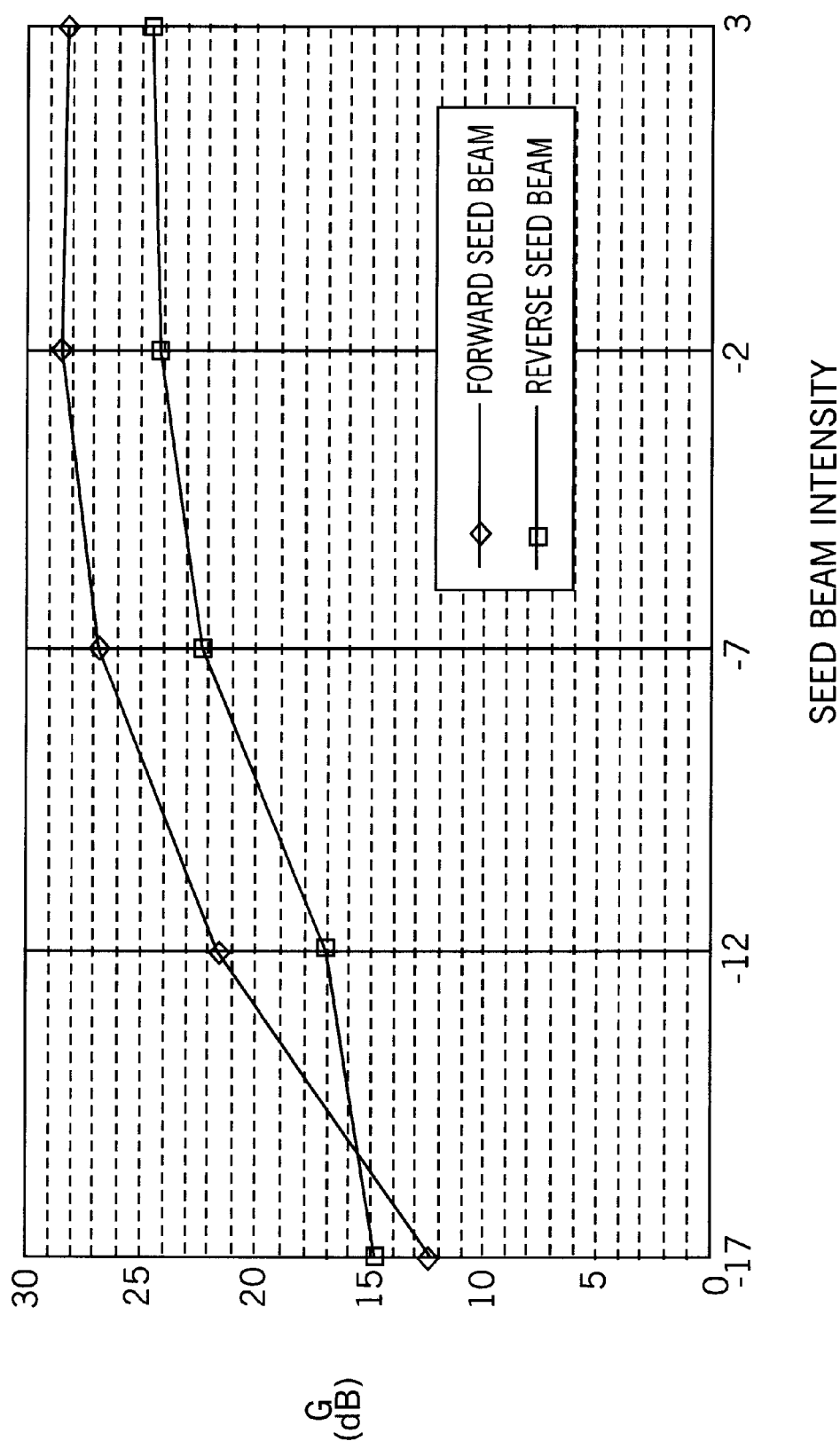
FIG. 4 is a graph showing output characteristics of the L-band optical fiber amplifiers according to the embodiments of the present invention, according to the principles of the present invention.

FIG. 4 is a graph showing a comparison between output gain characteristics of the L-band optical fiber amplifiers according to the first and second embodiments of the present invention. A seed beam is forward fed to an optical fiber in the first embodiment of the present invention, whereas it is reversely fed to the optical fiber in the second embodiment of the present invention.

The test was performed under the conditions that the wavelength of signal light is 1595 nm in the L-band and the output wavelength of a seed beam source is 1560 nm in the C band. The horizontal axis of the graph in FIG. 4 represents the output intensities of the seed beam source and the vertical axis represents the gains G of the L-band optical fiber amplifiers.

The L-band optical fiber amplifiers according to the related technology and the embodiments of the present invention were tested by varying the output intensity of the seedbeam to −17, −12, −7, −2, and 3 decibel meters (dBm).

As the result of the test, the gain of the L-band optical fiber amplifier of FIG. 1 without a seed beam source is 1 dBm and the gains of the L-band optical fiber amplifiers according to the embodiments of the present invention are shown in FIG. 4. The gain is 27 dB for a forward input seed beam with an output power of −7 dBm, for instance. For a reverse input seed beam with the same power, the gain is 22 dB. That is, the present invention obtains 28 dB and 23 dB more gains than the L-band optical fiber amplifier of FIG. 1.

As noted from the test, the L-band optical fiber amplifiers of the present invention increase the amplification efficiency of L-band signal light by increasing the gain of the L-band signal light. However, gains are slightly different according to the input direction (forward or reverse) of the seed beam. Forward seed beam input leads to a higher amplification efficiency than reverse seed beam input.

FIG. 5 is a graph showing gain characteristics of the L-band optical fiber amplifier according to the present invention with respect to wavelengths of a seed beam. A horizontal axis represents the wavelengths of a seed beam emitted from a seed beam source and a vertical axis represents the gains G of the L-band optical fiber amplifier.

The test was performed under the conditions that three L-band signal light at different wavelengths (1575, 1585, and 1595 nm) are input and a seed beam of −15 dBm is forward applied. It turned out that the L-band optical fiber amplifier of FIG. 1 had gains ranging −3.96 to 10.8 dB and a gain flatness of about 14.76 dB, whereas the L-band optical fiber amplifier of the present invention had gains ranging 25 to 27 dB and a gain flatness of 1 dB or below with a seed beam at 1555 to 1563 nm. For example, if the seed beam is 1559 nm, the gain and gain flatness are 26 dB and 1 or below, respectively in the present invention.

As described above, the L-band optical fiber amplifier using a seed beam, according to the principles of the present invention, is advantageous in that the amplification efficiency of L-band signal is increased by amplifying a C-band seed beam and then amplifing the L-band signal light with the amplified seed beam in turn, and gain flatness is increased with respect to wavelengths by controlling the output wavelengths of the seed beam according to changed intensity of input signal light or pumping light.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An L-band optical fiber amplifier apparatus, comprising:
    an optical fiber being doped with a rare-earth element;
    at least one pumping light source emitting pumping light to said optical fiber;

a seed beam source emitting a seed beam at a predetermined wavelength band to excite said optical fiber; and a seed beam coupler being disposed between an input terminal and said optical fiber, coupling an input optical signal with the seed beam and feeding the coupled light forward to said optical fiber.

2. The apparatus of claim 1, said seed beam source being a laser diode.

3. The apparatus of claim 1, the seed beam having a wavelength between 1555 nanometers and 1563 nanometers.

4. The apparatus of claim 1, said optical fiber being doped with erbium.

5. An L-band optical fiber amplifier apparatus, comprising:

an optical fiber being doped with a rare-earth element;

at least one pumping light source emitting pumping light to said optical fiber;

a seed beam source emitting a seed beam at a predetermined wavelength band to excite said optical fiber; and a seed beam coupler being disposed between an output terminal and said optical fiber, coupling an input optical signal with the seed beam and feeding the coupled light reversely to said optical fiber.

6. The apparatus of claim 5, the seed beam having a wavelength between 1555 nanometers and 1563 nanometers.

7. The apparatus of claim 5, further comprising an optical isolator being positioned between said seed beam source and said seed beam coupler, preventing light output from a rear end of said optical fiber from entering said seed beam source.

8. The apparatus of claim 5, said optical fiber being doped with erbium.

9. An apparatus, comprising:

an optical fiber;

at least one pumping light source emitting pumping light to said optical fiber;

a seed beam source emitting a seed beam to excite said optical fiber; and a seed beam coupler coupling an input optical signal with the seed beam and feeding the coupled light to said optical fiber.

10. The apparatus of claim 9, said apparatus corresponding to a long-band optical fiber amplifier.

11. The apparatus of claim 9, said optical fiber being doped with a rare-earth element.

12. The apparatus of claim 9, said seed beam source emitting the seed beam at a predetermined wavelength.

13. The apparatus of claim 9, said seed beam coupler being disposed between an input terminal and said optics fiber, said seed beam coupler feeding the coupled light forward to said optical fiber.

14. The apparatus of claim 13, said apparatus corresponding to along-band optical fiber amplifier.

15. The apparatus of claim 13, said optical fiber being doped with a rare-earth element.

16. The apparatus of claim 13, said seed beam source emitting the seed beam at a predetermined wavelength.

17. The apparatus of claim 13, said seed beam source being a laser diode.

18. The apparatus of claim 13, the seed beam having a wavelength between 1555 nanometers and 1563 nanometers.

19. The apparatus of claim 13, said optical fiber being doped with erbium.

20. The apparatus of claim 9, said seed beam coupler being disposed between an output terminal and said optical fiber, said seed beam coupler feeding the coupled light reversely to said optical fiber.

21. The apparatus of claim 20, said apparatus corresponding to a long-band optical fiber amplifier.

22. The apparatus of claim 20, said optical fiber being doped with a rare-earth element.

23. The apparatus of claim 20, said seed beam source emitting the seed beam at a predetermined wavelength.

24. The apparatus of claim 20, said seed beam source being a laser diode.

25. The apparatus of claim 20, the seed beam having a wavelength between 1555 nanometers and 1563 nanometers.

26. The apparatus of claim 20, said optical fiber being doped with erbium.

* * * * *